UNITED STATES PATENT OFFICE.

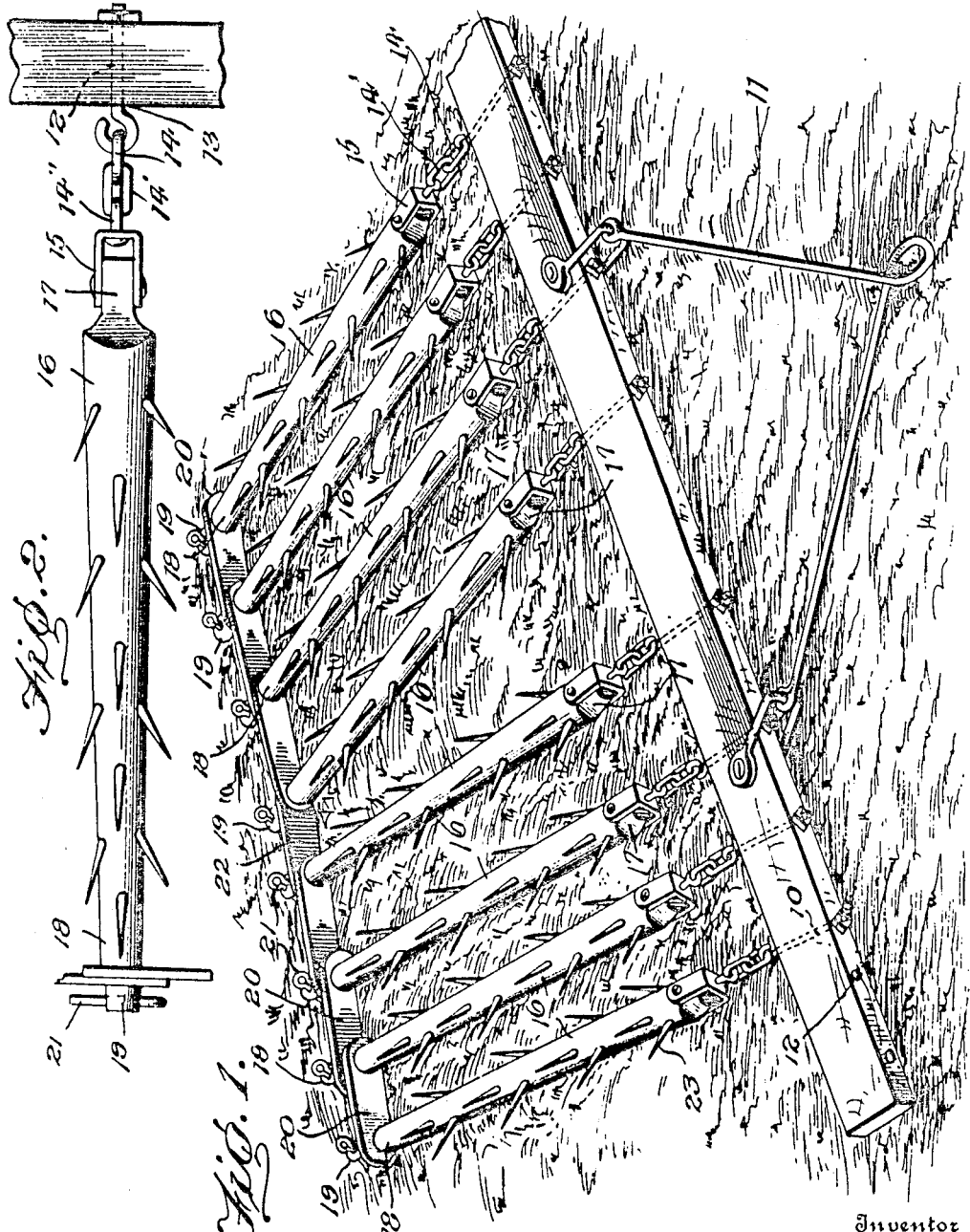

FRANK KRAMER, OF CHILLICOTHE, TEXAS.

DRAG-HARROW.

1,096,844. Specification of Letters Patent. Patented May 19, 1914.

Application filed February 15, 1913. Serial No. 748,690.

*To all whom it may concern:*

Be it known that I, FRANK KRAMER, citizen of the United States, residing at Chillicothe, in the county of Hardeman and State of Texas, have invented certain new and useful Improvements in Drag-Harrows, of which the following is a specification.

This invention relates to an improvement in drag harrows.

The primary object of the invention is to provide a soil pulverizer in which a rotary grinding action is produced by the drawing of the apparatus across the soil.

A further object of the invention is to provide an apparatus which includes a plurality of rotary soil pulverizers which may operate independently and which are flexibly connected at their terminals remote from the draft beam, the terminals forming a connection between the links which constitute the flexible connection.

Another object of the invention is to provide a plurality of rotary pulverizers which may be readily interchanged without totally disassembling the entire apparatus and in which sections may be added or removed to increase or diminish the size of the harrow.

In the drawings: Figure 1 is a perspective view, and Fig. 2 is a detail view of one of the rotary pulverizers.

In the drawings, 10 designates the beam to which the draft animals are attached, the beam being provided with a draft attachment 11. The beam throughout its length is formed with a plurality of apertures 12 and in each of these apertures a bolt 13 is arranged. Links 14 are connected to the bolts 13, said links being connected by links 14' with bolts 14'' which extend within the U-shaped members 15, thereby forming a swivel connection.

The pulverizers consist of rollers 16, the terminals 17 of which are square and extend within the U-shaped members 15, bolts passing through the U-shaped members and the square terminals of the rollers. The rollers taper throughout their length and their smaller terminals 18 are provided with trunnions 19. The rollers are connected by a plurality of links 20. The terminals of these links are provided with apertures through which the trunnions extend, the links overlapping the trunnions of the rollers connecting the links, cotter pins 21 passing through the trunnions beyond the links. In this manner, the terminals of the rollers remote from the beam 10 are flexibly connected, said terminals being rotatably supported by the links. The combined length of the links is less than the length of the beam 10, and the rollers are preferably divided into two sets, the rollers of each set being parallel. The two sets of rollers extend at a different angle with respect to the beam 10, for instance, as is illustrated in the drawing, there are eight rollers comprising two sets of four. Each set of rollers is connected by the links 20, which are all of the same length, the links 20 being connected by the short link 22, which disposes the two sets of rollers at the above-mentioned angle with respect to the beam 10. Thus, the rollers have a shearing drag with respect to the soil which would not occur were they disposed at right angles or allowed to assume a right angle position with respect to the drag beam.

Each of the rollers is provided with a plurality of spikes 23, disposed toward the smaller terminals of the rollers, that is, disposed in an opposite direction to that in which the harrow moves in its active travel. When the harrow is dragged across the ground, the rollers will rotate by reason of their sidewise contact with the soil, the spikes 23 contacting with the ground to rotate the rollers. In this manner, a shearing movement of the two sets of rollers is accomplished which pulverizes the soil without materially increasing the draw bar pull. The flexibility of the supporting mechanism materially assists in this decreasing of the pull, it being noted that the rollers may participate in an independent vertical movement which is not possible with the individual agitating members of the usual drag harrow.

The many advantages of a construction of this character will be clearly apparent, as it will be noted that the ground agitating members are each capable of independent rotation as well as a vertical movement, and that the members may be interchanged or removed without disassembling the entire apparatus, the size of the harrow being increased by adding link sections and additional rollers. It will also be noted that the construction is such as may be easily and economically manufactured and that the various parts may be readily assembled.

While the rollers have been shown as rotatably supported, it will be noted that they may be stationary and that instead of being formed circular in cross section, they may be V or T bars, the device not depending upon the exact construction of the bars for its effective operation.

Having thus described my invention, what I claim as new and desire to secure by Letters Patent is:

1. A drag harrow comprising a beam, a plurality of rollers each of which has a swivel connection with the beam and a link connection between the terminals of the rollers remote from the beam, whereby the rollers are supported for independent vertical movement and lateral movement in unison.

2. A drag harrow comprising a plurality of rotatably supported rollers, spikes carried by said rollers and disposed in a direction opposite to the line of travel of the harrow, said rollers being supported for lateral movement as well as independent vertical movement.

3. A drag harrow including a beam, rollers rotatably supported by the beam and disposed for lateral and vertical movement, the terminals of the rollers remote from the beam being flexibly connected together.

4. A drag harrow comprising a beam, rollers, a swivel connection between the rollers and the beam, and a flexible connection between the terminals of the rollers remote from the beam.

5. A drag harrow including a beam, rollers, a swivel connection between the rollers and the beam, links connecting the terminals of said rollers, the rollers being disposed in sets, and a short link interposed between each set of rollers whereby the sets are disposed at different angles with respect to the beam and maintained out of right angle position with respect to the beam.

In testimony whereof I affix my signature in presence of two witnesses.

FRANK KRAMER. [L. S.]

Witnesses:
ROSE PETERSON,
GEO. S. SKINNER.

---

Copies of this patent may be obtained for five cents each, by addressing the "Commissioner of Patents, Washington, D. C."